United States Patent Office 3,215,667
Patented Nov. 2, 1965

3,215,667
POLYCARBONATES CROSS-LINKED BY AROMATIC AZIDES OR DIAZIDES
John R. Caldwell and Winston J. Jackson, Jr., Kingsport, Tenn., assignors to Eastman Kodak Company, Rochester, N.Y., a corporation of New Jersey
No Drawing. Filed Sept. 14, 1961, Ser. No. 137,967
6 Claims. (Cl. 260—47)

This invention relates to cross-linking of linear thermoplastic polycarbonates by azides and diazides. More particularly the invention relates to compositions and methods for accomplishing such cross-linking.

An object of the invention is to provide a resin composition which is soluble in organic solvents but which reacts when cured by heat to form an insoluble resin. Another object is to provide cross-linked polycarbonate compositions. Another object is to provide a method for cross-linking linear polycarbonates by azides and diazides.

Aromatic azides and diazides have been used previously to cross-link olefinically unsaturated linear polymers and to cross-link polymers of olefinic monomers.

We have found that saturated linear thermoplastic bisphenol polycarbonates which are polyesters of carbonic acid and at least one diol including a bisphenol, can be cross-linked by azides or diazides under influence of heat. Accordingly, we have compounded mixtures of several typical polycarbonates with typical aromatic azides and diazides and have found that these mixtures, when exposed to elevated temperatures, react to form a cross-linked resin which is insoluble in most commercial organic solvents.

A large variety of thermoplastic linear polycarbonates have been produced and we have successfully cross-linked resins typical of most of the known thermoplastic polycarbonate types by using aromatic azides and aromatic diazides as cross-linking agents. Our copending application entitled "Bisphenol Polyesters," filed of even date herewith, S.N. 137,980, now abandoned, and Schnell, Angew. Chemie 68, 633 (1956), describe a large number of linear thermoplastic bisphenol polycarbonates typical of those which may be used in this invention.

Aromatic azides (Ar—N₃) and aromatic diazides (N₃—Ar—N₃) are effective as cross-linking agents. The diazides are preferred. Some typical cross-linking agents for linear polycarbonates are 4,4'-diazidodibenzalacetone; 2,3 - diazido-1,4-naphthoquinone; 2,5-bis(p-azidostyryl)-1,3,4 - oxadiazole; 2,6-bis(p-azidobenzylidene)-4-methylcyclohexanone; bis(p-azidophenyl)sulfide; p-azidobenzoic acid; and m-azido-cinnamic acid.

A linear thermoplastic polycarbonate is cross-linked by first intimately mixing the polycarbonate resin with from 3 to 8 percent by weight of one of the azide or diazide agents and then heating the mixture for from 1 to 3 hours at a temperature of from 160 to 240° C. Mixing is conveniently accomplished by dissolving the ingredients in a volatile organic solvent and then evaporating the solvent. Following are specific examples of the invention.

*Example I*

1 gram of a polycarbonate prepared from Bisphenol A (4,4'-isopropylidene diphenol) and phosgene was dissolved in methylene chloride with 0.05 g. of 2,5-bis(p-azidostyryl)-1,3,4-oxadiazole and a film was cast. After heating at 180° C. for 1 hour, the film was insoluble in methylene chloride, toluene, dioxane, and other common solvents.

*Example II*

1 gram of a polycarbonate prepared from 4,4'-(2-norcamphanylidene)diphenol and phosgene was dissolved in methylene chloride with 0.06 g. of 4,4'-diazido-dibenzalacetone and a film was cast. After heating at 220° C. for 1 hour, the film was insoluble in methylene chloride, toluene, dioxane and other common solvents.

*Example III*

1 gram of a polycarbonate prepared from 4,4'-(hexahydro-4,7-methanoindan-5-ylidene)diphenol and phosgene was dissolved in methylene chloride with 0.05 g. of 2,6 - bis(p-azidobenzylidene)-4-methylcyclohexanone and a film was cast. After heating at 200° C. for 1½ hours, the film was insoluble in the common organic solvents.

*Example IV*

One gram of a polycarbonate prepared from 4,4'-(2-norcamphanylidene)bis(2,6 - dichloro)phenol and phosgene was dissolved in methylene chloride with 0.06 g. of p-azidobenzoic acid and a film was cast. After heating at 200° C. for 3 hours, the film was insoluble in the common organic solvents.

The uses for the cross-linked polycarbonates are as varied as the uses for the linear polycarbonates. Fibers, films and coatings may be made from the mixture of a linear thermoplastic polycarbonate with the cross-linking agent and they may be heat-cured to render them insoluble in ordinary solvents. Advantages of such insoluble articles are apparent; for instance, fibers can be used in fabrics to be dry cleaned; films and coatings will be resistant to common cleaning solvents, etc.

The examples given in the foregoing description illustrate specific embodiments of the invention and should not be construed to limit the scope of the invention as defined in the following claims.

We claim:
1. A method for preparing a cross-linked linear polycarbonate resin comprising intimately mixing a thermoplastic bisphenol polycarbonate resin with from 3 to 8 weight percent of a cross-linking agent selected from the group consisting of aromatic azides and aromatic diazides and curing the mixture at an elevated temperature until said cross-linked linear polycarbonate resin is obtained.

2. A method for preparing a cross-linked linear polycarbonate resin comprising intimately mixing a thermoplastic bisphenol polycarbonate resin with from 3 to 8 weight percent of a cross-linking agent selected from the group consisting of aromatic azides and aromatic diazides and curing the mixture for from 1 to 3 hours at a temperature from 160° C. to 240° C.

3. A method for preparing a cross-linked linear polycarbonate resin comprising intimately mixing a linear thermoplastic bisphenol polycarbonate resin with from 3 to 8 weight percent of a cross-linking agent selected from the group consisting of 4,4'-diazidodibenzalacetone; 2,3-diazido - 1,4 - naphthoquinone; 2,5 - bis(p - azidostyryl)-1,3,4 - oxadiazole; 2,6-bis(p-azidobenzylidene)-4-methylcyclohexanone; bis(p-azido phenyl)sulfide; p-azidobenzoic acid; and m-azido cinnamic acid, and curing the mixture for from 1 to 3 hours at a temperature from 160° C. to 240° C.

4. A cross-linked linear polycarbonate resin prepared by the method of claim 1.

5. A cross-linked linear polycarbonate resin prepared by the method of claim 2.

6. A cross-linked linear polycarbonate resin prepared by the method of claim 3.

References Cited by the Examiner

FOREIGN PATENTS

| | | |
|---|---|---|
| 816,680 | 7/59 | Great Britain. |
| 1,079,950 | 4/60 | Germany. |

MURRAY TILLMAN, *Primary Examiner.*

HAROLD N. BURSTEIN, *Examiner.*